United States Patent Office 3,714,168
Patented Jan. 30, 1973

3,714,168
PREPARING α-BROMOMETHYL KETONES VIA SUBSTITUTED DIETHYL MALONATES
Robert E. Olsen, Shingle Springs, Calif., assignor to the United States of America as represented by the Secretary of the Army
No Drawing. Filed Mar. 27, 1970, Ser. No. 23,506
Int. Cl. C07d 33/36
U.S. Cl. 260—281 R        5 Claims

ABSTRACT OF THE DISCLOSURE

The present invention discloses a process for the preparation of monobromo methyl ketones in high yield and good purity. The invention also discloses a composition synthesized from the process for use as an intermediate in the preparation of an antimalarial drug of known effectiveness. The antimalarail intermediate is 6-bromo-phenanthrene-9α-bromomethyl ketone having the formula:

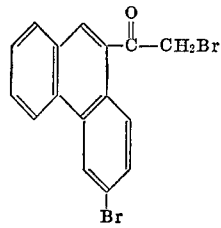

The invention herein described was made in the course of or under a contract or subcontract thereunder with the Department of the Army.

BACKGROUND OF THE INVENTION (1) Field of the invention

The invention relates to the process for preparing monobromomethyl ketones and to compositions produced from the process for use as antimalarial drug intermediates.

(2) Description of the prior art

Considerable difficulties are normally associated with the preparation of monobromomethyl ketones, since it is impossible to separate mixtures of dibromo- and monobromo-methyl ketones which are normally produced by conventional synthetic routes. Various methods are known for the preparation of the ketones. See, e.g., U.S. Pat. No. 3,013,079, Pearson; U.S. Pat. No. 2,838,570, Winterhalder; and U.S. Reissue Pat. No. 26,009, Buckman et al.

The α-bromomethyl ketones have utility not only as antimalarial drug intermediates, but also as slime control agents (see, e.g., U.S. Reissue Pat. No. 26,009, Buckman et al.) and as epinephrine antagonist intermediates (see, e.g., U.S. Pat. No. 3,281,468, Mills).

SUMMARY OF THE INVENTION

The present invention discloses a process for the synthesis of α-bromomethyl ketones as follows:

Equation 1.
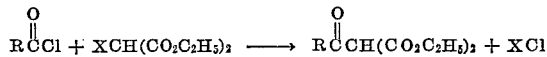

Equation 2.

Equation 3.
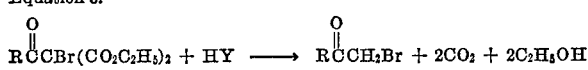

where R is an alkyl, aromatic, heterocyclic, or substituted alkyl, aromatic or heterocyclic group, and where X is the cation of any base strong enough to extract a portion from diethyl malonate, and where Y is the anion of any strong acid.

The bromination of a substituted diethyl malonate (Equation 2) can produce only a monobromo derivative and subsequent decarboxylation (Equation 3) then provides monobromomethyl ketones in high yield and purity.

This specific composition which is produced from this process and which is useful as an intermediate in the preparation of known antimalarial drugs is 6-bromo-phenanthrene-9-α-bromomethyl ketone having the formula:

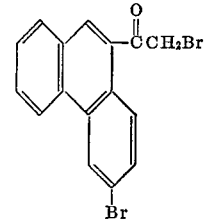

It is an object of the present invention therefore to disclose a process for preparation of monobromomethyl ketones having high yield and good purity.

It is also an object of the present invention to synthesize a phenanthrene derivative for use as an intermediate in the preparation of antimalarial drugs using the disclosed process.

DESCRIPTION OF THE PREFERRED EMBODIMENT (1) The process.—The synthesis of the α-bromomethyl ketone is carried out in three steps:

STEP 1

Step 1 involves the formation of a diethyl substituted carbonyl malonate from a substituted carbonyl chloride and a substituted diethyl malonate. The substituent, represented by X above, may be any cation of any base strong enough to extract a proton from diethyl malonate and as used in the present invention the substituted diethyl malonate is either diethyl ethoxymagnesium malonate or diethyl sodium malonate. R may be any alkyl, aromatic, heterocyclic or substituted alkyl, aromatic and heterocyclic groups.

STEP 2
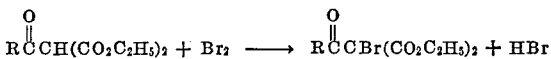

Step 2 involves the monobromination of the diethyl substituted carbonyl malonate on the α carbon.

STEP 3
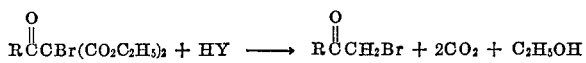

The reaction product of Step 2 undergoes acid-catalyzed decarboxylation in Step 3 in the presence of a strong acid. Y above may be the anion of any strong acid such as HBr or HCl. The product formed is an α-bromomethyl ketone.

The conditions under which the above general reaction takes place along with specific reactants and specific end products are disclosed in the following examples.

EXAMPLE I

Preparation of 2-(4′-chlorophenyl)6,8-dimethyl-quinoline-4-α-bromomethyl ketone

Step 1. Formation of diethyl 2-(4′-chlorophenyl)-cinchoninyl malonate.—To a dry, 250 ml. r.b. flask fitted with a stirrer, dropping funnel and reflux condenser containing a Drierite drying tube was added 2.67 gm. (0.11 mole) of magnesium turnings, 5.0 ml. of absolute ethanol, 0.25 ml. of carbon tetrachloride and 50 ml. of dry tetrahydrofuran. The mixture was heated to reflux and a solution of 17.6 gm. (0.11 mole) of diethyl malonate and 7.5 ml. of absolute ethanol in 15 ml. of dry tetrahydrofuran was added dropwise over a one hour period. (*Caution*: Large amounts of foam build up during the addition.) The mixture was then refluxed with stirring until a clear light gray solution was obtained (about 90 minutes), cooled and transferred to a dropping funnel protected with a drying tube.

To a dry, 500 ml. r.b. flask fitted with a stirrer, dropping funnel and reflux condenser containing a drying tube was placed 33.0 gm. (0.10 mole) of 2-(4'-chlorophenyl)-6,8-dimethylcinchoninyl chloride in 250 ml. of dry tetrahydrofuran. The slurry was brought to a reflux and the preformed solution of diethyl ethoxymagnesium malonate added over a one hour period. The solution was then refluxed for three hours, after which time about one-half the solvent removed by distillation and the reaction mixture quenched into a slurry of 1000 gm. of ice and 180 ml. of concentrated sulfuric acid. The product, diethyl 2-(4'-chlorophenyl)cinchoninyl malonate, was isolated (filtration) and a portion recrystallized from ethyl acetate to give a white powder (melting point 159–161° C.). The total yield was 44.5 gm. (98%).

*Analysis.*—Calcd. for $C_{25}H_{24}NO_5Cl$ (percent): C, 66.2; H, 5.30; N, 3.09. Found (percent): C, 66.1; H, 5.50; N, 2.98. Infrared and proton NMR spectra were consistent with the desired structure.

Step 2. Formation of diethyl α-bromo-2-(4'-chlorophenyl)-6,8-dimethylcinchoninyl malonate.—To a stirred, refluxed solution of 227 gm. (0.50 mole) of diethyl 2-4'-chlorophenyl)-6,8 - dimethylcinchoninyl malonate in 2500 ml. of chloroform was added over a 30-minute period a solution of 88.0 gm. (0.55 mole) of bromine in 250 ml. of chloroform. The resulting dark red solution was stirred at reflux for an additional 30 minutes, then cooled to ambient temperature and washed with 1000 ml. of water. Aqueous sodium carbonate 10%, (1000 ml.) was added causing the sodium cinchophen salt to precipitate. Agitation formed an emulsion, which was filtered to allow phase separation. The chloroform solution was washed again with 1000 ml. of water and dried over anhydrous sodium sulfate. Removal of solvent under reduced pressure left 231 gm. (87.5% yield) of diethyl α-bromo-2-(4'-chlorophenyl) - 6,8 - dimethylcinchoninyl malonate as a bright yellow powder. Recrystallization of a portion from ethanol gave bright yellow needles (melting point 124–126° C.); infrared and proton NMR spectra were consistent with the proposed structure.

Step 3. Formation of 2-(4'-chlorophenyl)-6,8-dimethylquinoline-4α-bromomethyl ketone.—A solution of 21.3 gm. (0.04 mole) of diethyl - α - bromo - 2,4'-(4'-chlorophenyl)-6,8-dimethylcinchoninyl malonate in 100 ml. of glacial acetic acid was rapidly heated to reflux and 30 ml. of 48% aqueous hydrobromic added in about two minutes. Thirty-two minutes were required to give 1.91 liters (106% of theory) of carbon dioxide. The reaction was then rapidly quenched into 300 ml. of ice water, precipitating the product as a pale yellow powder. The product (15.0 gm.) was collected (filtration), dried and analyzed by proton NMR, showing 12% methyl ketone, 14% cinchophen and 74% 2-(4'-chlorophenyl) - 6,8 - dimethylquinoline-4α-bromomethyl ketone. As previously mentioned, the cinchophen was removed from the mixture by extraction with methylene chloride and filtering the resulting slurry. The ketone mixture was reduced (using aluminum isopropoxide) to a mixture of bromohydrin and methyl carbinol. Subsequent reaction with alcoholic potassium hydroxide produced a methanol-insoluble ethylene oxide derivative and a methanol-soluble methyl carbinol. The product has the formula:

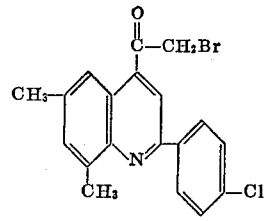

EXAMPLE II

Preparation of 2-(4'-chlorophenyl)-6-methoxy-7-chloroquinoline-4-α-bromomethyl ketone hydrobromide Step 1. Formation of diethyl 2-(4'-chlorophenyl)-6-methoxy-7-chlorocinchoninyl ketone.—To a dry, r.b. flask fitted with a stirrer, dropping funnel and reflux condenser containing a Drierite drying tube was added 506 gm. (1.38 moles) of 2-(4'-chlorophenyl)-6-methoxy-7-chlorocinchoninyl chloride and 3000 ml. of dry tetrahydrofuran. The mixture was heated to reflux and a solution of 342 gm. (1.50 moles) of diethyl ethoxymagnesium malonate in 650 ml. of tetrahydrofuran was added over a 30-minute period. The solution was refluxed for two hours and about 2000 ml. of solvent was distilled off. The reaction was then quenched into a solution of nine liters of ice water and 581 gm. of concentrated sulfuric acid. The product was isolated by filtration, washed well with water and dried. The malonate derivative (melting point 145.5–148.5° C.) was isolated in 96% yield (637 gm.) and gave infrared and proton NMR spectra consistent with the proposed structure.

*Analysis*—Calcd. for $C_{24}H_{21}NO_6Cl_2$ (percent): C, 58.8; H, 4.32; N, 2.86. Found (percent): C, 59.1; H, 4.59; N, 2.99.

Step 2. The formation of diethyl α-bromo-2-(4'-chlorophenyl) - 6 - methoxy-7-chlorocinchoninyl malonate.—A solution of 151 gm. (0.308 mole) of diethyl 2-(4'-chlorophenyl)-6-methoxy-7-chlorocinchoninyl malonate in 1000 ml. of chloroform was heated to reflux and a solution of 49.7 gm. (0.31 mole) of bromine in 100 ml. of chloroform was added over a 30-minute period. The solution was refluxed an additional 30 minutes, then quenched by the addition of 300 ml. of water. The phases were separated and chloroform was washed with 300 ml. of 5% aqueous caustic and then 300 ml. of water. The chloroform was dried over anhydrous magnesium sulfate and solvent removed in vacuo to leave a bright yellow powder. Infrared and proton NMR spectroscopy confirmed that the desired product was obtained. The product, diethyl α-bromo-2-(4'-chlorophenyl)-6-methoxy-7-chlorocinchoninyl malonate (163 gm., 93% yield) was recrystallized three times from alcohol, but exhibited a wide melting point, 118–126° C. It was used without further purification in the next reaction.

Step 3. The formation of 2-(4'-chlorophenyl)-6-methoxy - 7 - chloroquinoline-4-α-bromomethyl ketone hydrobromide.—A solution of diethyl α-bromo-2-(4'-chlorophenyl)-6-methoxy-7-chlorocinchoninyl malonate (22.7 gm., 0.04 mole) in 100 ml. of acetic acid and 30 ml. of 48% aqueous hydrobromic acid was heated to reflux. After 22 minutes, carbon dioxide evolution had ceased (1.78 liters, 99% of theory) and formation of a yellow solid was observed. The reaction mixture was quenched into ice water and filtered. The bright yellow filter cake was washed well with water and dried in vacuo to give 17.2 gm. (85% yield, melting point 185–188° C.) of 2-(4' - chlorophenyl) - 6 - methoxy-7-chloroquinoline-4-α-bromomethyl ketone hydrobromide. Proton NMR and infrared spectroscopy confirmed the structure. The product has the formula:

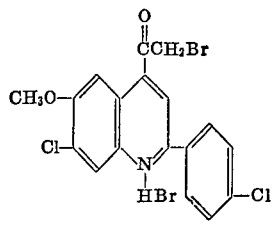

EXAMPLE III

Preparation of 2-(4'-chlorophenyl)-6-chloroquinoline-4-α-bromomethyl ketone hydrobromide Step 1. The formation of diethyl 2-(4'-chlorophenyl)-6-chlorocinchoninyl malonate.—A solution of 305 gm. (0.91 mole) of 2-(4'-chlorophenyl)-6-chlorocinchoninyl chloride in 3000 ml. of dry tetrahydrofuran was heated to reflux and a solution of 250 gm. (1.10 moles) of diethyl ethoxymagnesium malonate in 650 ml. of dry tetrahydrofuran was added over a 30-minute period. The solution was refluxed for two hours, then quenched into eight liters of ice water and 500 ml. of concentrated sulfuric acid. The product, a pale yellow color, was isolated by filtration, washed well with water and dried in vacuo. Proton NMR and infrared spectroscopy confirmed that diethyl 2-(4'-chlorophenyl)-6-chlorocinchoninyl malonate 385 gm., (95% yield) was obtained.

Step 2. Formation of diethyl α-bromo-2-(4'-chlorophenyl)-6-chlorocinchoninyl malonate.—A mixture of 358 gm. (0.78 mole) of diethyl 2-(4'-chlorophenyl) in 3500 ml. of chloroform was heated to 40° C. and 127 gm. (0.795 mole) of bromine in 370 ml. of chloroform added over a one hour period. A dark red solution was formed during the subsequent one hour stir period. The chloroform was washed with 1000 ml. of water and then 1000 ml. of 5% aqueous caustic. A small amount of solids precipitated during the caustic wash, causing an emulsion to form. The mixture was filtered through filter-aid, breaking the emulsion and allowing phase separation. The chloroform was washed with 1000 ml. of water, dried over anhydrous magnesium sulfate and solvent removed in vacuo to leave an off-white powder (378 gm., 90% yield). Proton NMR and infrared spectroscopy confirmed that the desired diethyl α-bromo-2-(4'-chlorophenyl)-6-chlorocinchoninyl malonate was formed.

Step 3. Formation of 2-(4'-chlorophenyl)-6-chloroquinoline-4-α-bromomethyl ketone hydrobromide.—A solution of diethyl α-bromo-2-(4'-chlorophenyl)-6-chlorocinchoninyl malonate (21.5 gm., 0.04 mole) in 50 ml. of glacial acetic acid was heated to reflux and 15 ml. of 48% aqueous hydrobromic acid added in two minutes. After 21 minutes carbon dioxide evolution had ceased (1.70 liters, 95% of theory) and the formation of a yellow solid was observed. The reaction was quenched into water and filtered. The product was obtained by filtration and was washed well with water. After drying in vacuo 13.0 gm. (82% yield, melting point 249–251° C. dec., lit. melting point 250–253° C. dec.) of 2-(4'-chlorophenyl)-6-chloroquinoline-4-α-bromomethyl ketone hydrobromide was obtained. Infrared and proton NMR confirmed the structure. The product has the formula:

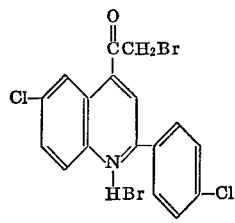

EXAMPLE IV

Preparation of 2-(4'-chlorophenyl)-7-chloroquinoline-4-α-bromomethyl ketone hydrobromide Step 1. Formation of diethyl 2-(4'-chlorophenyl)-7-chlorocinchoninyl malonate.—A solution of 305 gm. (0.91 mole) of 2-(4'-chlorophenyl)-7-chlorocinchoninyl chloride in 3500 ml. of dry tetrahydrofuran was heated to reflux and 250 gm. (1.10 moles) of diethyl ethoxymagnesium malonate in 650 ml. of dry tetrahydrofuran added over a 45-minute period. The solution was refluxed an additional two hours and allowed to stand at room temperature overnight. Solvent (2000 ml.) was removed by distillation and the reaction then quenched into 8000 ml. of ice water and 500 ml. of concentrated sulfuric acid. The product separated as fluffy yellow tufts, which were isolated by filtration, washed well with water and then washed with about 400 ml. of cold alcohol. After drying in vacuo 388 gm. (93% yield) of diethyl 2-(4'-chlorophenyl)-7-chlorocinchoninyl malonate was obtained. The structure was confirmed by proton NMR and infrared analysis.

Step 2. Formation of diethyl α-bromo-2-(4'-chlorophenyl)-7-chlorocinchoninyl malonate.—A mixture of 358 gm. (0.78 mole) of diethyl 2-(4'-chlorophenyl) cinchoninyl chloride and 3500 ml. of chloroform was heated to 40° C. and a solution of 127 gm. (0.795 mole) of bromine in 370 ml. of chloroform added over a 30-minute period. The solids dissolved during the first third of bromine addition and the formation of a new solid during the second third of the bromine addition. The reaction was held at 40° C. for an additional 30 minutes, then quenched by the addition of 1000 ml. of water. The phases were separated (the solids were dense and were with the chloroform layer) and product phase washed with 10% sodium carbonate solution. The solids dissolved during this basic wash. The chloroform solution was washed with 1000 ml. of water, dried over anhydrous magnesium sulfate and solvent removed under reduced pressure to leave 341 gm. (81.5%) of diethyl α-bromo-2-(4'-chlorophenyl)-7-chlorocinchoninyl malonate. Proton NMR and infrared analysis confirmed the structure.

Step 3. Formation of 2-(4'-chlorophenyl)-7-chloroquinoline-4-α-bromomethyl ketone hydrobromide.—A solution of 21.5 gm. (0.04 mole) of diethyl α-bromo-7-chlorocinchoninyl malonate in 50 ml. of glacial acetic acid was rapidly heated to reflux and 15 ml. of 48% aqueous hydrobromic acid added over a two-minute period. After 26 minutes carbon dioxide evolution had ceased (1.72 liters, 96% of theory) and the formation of a yellow solid was noted. The reaction was quenched into water, filtered and the filter cake washed with water. After drying in vacuo, 17.06 gm. (89.6%, melting point 236–239° C., lit. melting point 238–240° C.) of 2-(4'-chlorophenyl)-7-chloroquinoline-4-α-bromomethyl ketone hydrobromide was obtained. The product has the formula:

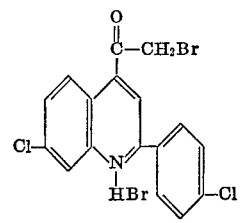

EXAMPLE V

Preparation of 6-bromo-phenanthrene-9-α-bromomethyl ketone

Step. 1. Formation of diethyl 6-bromo-9-phenanthroyl malonate.—A slurry of 266 gm. (5.88 moles) of a 51.5% sodium hydride-mineral oil dispersion in 2500 ml. of dry tetrahydrofuran was heated to reflux and 940 gm. (5.88 moles) of diethyl malonate added over a 30-minute period. The reaction was refluxed for an additional one hour to complete conversion to diethyl sodiomalonate. A hot (65–68° C.) solution of 750 gm. (2.35 moles) of 6-bromo-9-phenanthroyl chloride in 4000 ml. of dry tetrahydrofuran was then added over a 15-minute period. The malonate slurry became a bright red color upon the addition of the acyl chloride solution. After addition was complete, the red reaction was refluxed an additional two hours, then cooled to ambient temperature and quenched into a well-stirred solution of 23 liters of water and four liters of concentrated sulfuric acid. On quenching, the formation of light tan crystals was immediately observed. The product slurry was rapidly stirred for four hours, filtered and the filter cake washed well with water until the washings were above pH 4 (about eight liters of water required). On drying in vacuo, 997 gm. (96% yield) of diethyl 6-bromo-9-phenanthroyl malonate was obtained. A small portion was recrystallized from alcohol (charcoal) to give feathery white needles (melting point 118–118.5° C.).

Analysis.—Calcd. for $C_{22}H_{19}O_5Br$ (percent): C, 59.7; H, 4.29. Found (percent): C, 59.8; H, 4.31.

Step 2. Formation of diethyl α,6-dibromo-9-phenanthroyl malonate.—A mixture of 193 gm. (0.436 mole) of diethyl 6-bromo-9-phenanthroyl malonate in 2350 ml. of chloroform was heated to reflux and a solution of 70.5 gm. (0.440 mole) of bromine in 200 ml. of chloroform was added over a one-hour period. The mixture was then refluxed for two hours, cooled to ambient temperature and quenched by addition of 800 ml. of water. The mixture was filtered (filter-aid) to remove a small amount of insolubles. The phases were separated and the chloroform phase washed with 1800 ml. of a 5% caustic solution and then 800 ml. of water. The chloroform phase was separated, dried over anhydrous magnesium sulfate and solvent removed under reduced pressure to leave an off-white powder (210 gm., 91% yield). A small portion was recrystallized from alcohol (charcoal) to give a white powder (melting point 130–131° C.) which gave elemental, infrared and proton NMR analysis consistent with diethyl α,6-dibromo-9-phenanthroyl malonate.

Analysis.—Calcd. for $C_{22}H_{18}O_5Br_2$ (percent): C, 50.6; H, 3.45; Br, 30.6. Found (percent): C, 50.7; H, 3.61; Br, 30.4.

Step 3. Formation of 6-bromo-phenanthrene-9-α-bromomethyl ketone.—A solution of 632 gm. (1.21 moles) of diethyl α,6-dibromo-9-phenanthroyl malonate in 3040 ml. of glacial acetic acid was heated to reflux and 608 ml. of 48% aqueous hydrobromic acid added over a five-minute period. The reaction was followed by measuring the carbon dioxide evolution through a wet-test meter; after 33 minutes reaction, 57.6 liters (107% of theory) of carbon dioxide had been measured and the gas evolution rate had dropped to 0.3 liter per minute. The reaction was then quenched into a mixture of 10 liters of water and six liters of chloroform. Phases were separated and the chloroform-product solution washed with eight liters of 2% caustic and then 3200 ml. of water. The chloroform solution was dried over anhydrous magnesium sulfate, stripped under reduced pressure to leave a light tan powder (392 gm., 86% yield). A small portion was recrystallized from methyl isobutyl ketone (charcoal) to give 6-bromo-9-(ω-bromoacetyl)-phenanthrene (melting point 128–130° C.) as a white powder.

Analysis.—Calcd. for $C_{16}H_{10}OBr_2$ (percent): C, 50.7; H, 2.64; Br, 42.3. Found (percent): C, 50.8; H, 2.85; Br, 42.0.

The product has the formula:

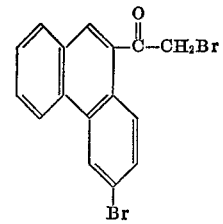

The above examples are not intended to limit the scope of the process, for, as was noted, the process may be used in the preparation of any α-bromomethyl ketone which has substituted on the carbonyl functional group a member selected from the group consisting of any alkyl, aromatic heterocyclic, or substituted alkyl, aromatic or heterocyclic.

The following table demonstrates the yields involved in each of the three steps of the five examples and indicates the purity of the end product.

| α-Bromomethyl ketone | Percent yield, percent of theoretical | | | Percent purity of end product |
|---|---|---|---|---|
| | Step 1 | Step 2 | Step 3 | |
| Example I, 2-(4'-chlorophenyl)-6,8-dimethylquinoline-4-α-bromomethyl ketone | 96 | 92 | 65 | 90-95 |
| Example II, 2-(4'-chlorophenyl)-6-methoxy-7-chloroquinoline-4-α-bromoethyl ketone | 96 | 93 | 85 | 90-95 |
| Example III, 2-(4'-chlorophenyl)-6-chloroquinoline-4-α-bromomethyl ketone | 92 | 90 | 82 | 90-95 |
| Example IV, 2-(4'-chlorophenyl)-7-chloroquinoline-4-α-bromomethyl ketone | 93 | 81 | 89 | 90-95 |
| Example V, 6-bromo-phenanthrene-9-α-bromomethyl ketone | 96 | 92 | 86 | 90-95 |

As the preceding table indicates the monobromination and formation of the end product take place with high yields and the end product has excellent purity.

(2) The antimalarial intermediate.—Example V, the 6-bromo-phenanthrene-9-α-bromomethyl ketone, is the composition used as the antimalarial intermediate. This intermediate was converted to 6-bromo-α-(diheptylaminomethyl)-9-phenanthrenemethanol, having the formula:

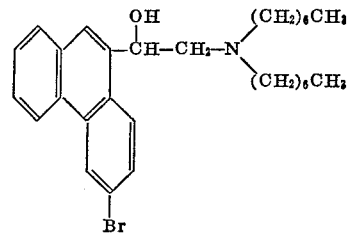

The conversion was carried out by first subjecting the intermediate to the conversion of the ketone to an epoxy as taught in U.S. Pat. No. 2,816,059, Mills:

where R is the substituted phenanthrene. The epoxy was then subjected to the diheptyl amine for conversion to the end product as follows:

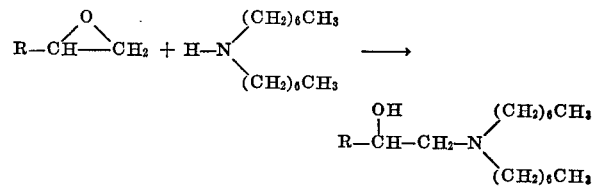

This end product was tested for its effect as an antimalarial drug by the Department of the Army, Walter Reed Army Institute of Research using the following method and parameters.

(a) Test procedures

This test system is based on comparisons of responses to test compounds by *Plasmodium berghei* malaria in mice as expressed in maximum survival times as compared to survival times of untreated control mice. Thus, compounds noted as active produce increases in the survival times of the treated mice that are significant when compared with the survival times of the untreated control mice. Since an established disease is less development, treatment is withheld until the parasitemia is relatively high in order to insure a more reliable assay of activity and the selection of appropriate compounds for intensive preclinical studies.

Utilizing young ICR/Ha Swiss mice and a standard inoculum of *Plasmodium berghei*, it is possible to produce a uniform disease fatal to 100% of untreated animals within six to eight days with a mean survival time of 6.2 to 0.49 days.

(b) Specific method

Animal hosts.—Non-inbred ICR/Ha Swiss mice are used in screening. Test animals weigh from 18 to 22 gm. but the weight variations in any given experimental or control group are confined to 2–3 gm. All animals in any given test are approximately of the same age. Animals on test are housed in metal-topped plastic cages, given a standard laboratory diet and water ad lib.

Test procedure.—Test animals receive an intraperitoneal injection of 0.5 ml. of a 1:100 dilution of heparinized heart's blood with a minimum of 90% parasitized cells drawn from donor mice infected one week earlier with *Plasmodium berghei*. The donor strain is maintained by weekly passages in separate groups of mice inoculated with a 0.5 ml. of 1:500 dilution of heparinized heart's blood.

Drug administration.—Test compounds are usually administered after solution or suspension in sesame or peanut oil. A single dose is given subcutaneously 72 hours after the mice are infected with *Plasmodium berghei*. At this time a 10–15% parasitemia has developed; the disease is well established but has not produced sufficient debility to alter the response of the host to toxic effects of the drug on test. Since treatment is withheld for three days to permit the infection to become well established and death occurs in untreated controls within six to eight days, it is felt that this system presents a candidate compound with the maximum challenge. Treated animals are kept under observation for 60 days. Survivors at the end of this period of time are considered as cured. In order to check factors such as changes in the infectivity of *Plasmodium berghei* or in the susceptibility of the host or to detect technical errors a group of infected animals treated with pyrimethamine at dose levels producing definite increases in survival time is included as a positive control in every experiment. In each experiment test compounds are administered in graded dosages. With highly active compounds, increases in dose levels are usually followed by increases in the survival time of the treated mice. However, if an active drug is toxic for the host, its toxicity may become a limiting factor; continued increases in dose levels also increase the toxic effects and may result in the diminution of survival times. Deaths prior to the sixth day, when untreated controls begin to die, are regarded as non-parasitic and become the basis for toxicity evaluations.

Drug activity.—An increase of 100% in survival time is considered the minimum effective response for a candidate compound.

Using the above test procedures, the following table indicates the effectiveness of the antimalarial, 6-bromo-α-(diheptylaminomethyl)-9-phenanthrenemethanol.

PRIMARY MOUSE TEST

| Milligrams/ kilograms | Sex | MST, T/C [1] | Difference [2] (T minus C) | Curative rate |
|---|---|---|---|---|
| 40 | F | 10.0/6.3 | +3.7 | |
| 160 | F | 13.5/6.3 | +7.2 | ⅓ cured. |
| 640 | F | 30.0/6.3 | +23.7 | ⅗ cured. |
| 5 | F | 8.2/6.3 | +1.9 | |
| 10 | F | 8.4/6.3 | +2.1 | |
| 20 | F | 10.6/6.3 | +4.3 | |
| 40 | F | 13.0/6.3 | +6.7 | Active. |
| 80 | F | 14.3/6.3 | +8.0 | ⅓ cured. |
| 160 | F | 14.5/6.3 | +8.2 | ⅗ cured. |

[1] MST T/C is the Mean Survival Time in days of the Treated animals/ Control animals.
[2] Difference (T minus C) is the number of days of the Mean Survival Time of Control animals subtracted from the number of days of the Mean Survival Time of Treated animals.

As can be seen from the data, the compound in question is an effective antimalarial drug.

I claim:

1. A process for the preparation of α-bromomethyl ketones having the formula:

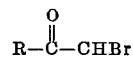

$$R-\overset{O}{\underset{\|}{C}}-CHBr$$

where R is a member of the group consisting of phenyl, naphthyl, phenanthryl, quinolyl, or substituted phenyl, naphthyl, phenanthryl, and quinolyl wherein the substituted group is halo, lower alkyl, lower alkoxy phenyl, or halo phenyl, comprising the steps of:

(a) reacting a substituted carbonyl chloride having the formula:

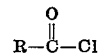

$$R-\overset{O}{\underset{\|}{C}}-Cl$$

where R is a member of the group consisting of phenyl, naphthyl, phenanthryl, quinolyl or substituted phenyl, naphthyl, phenanthryl, and quinolyl wherein the substituted group is halo, lower alkyl, lower alkoxy phenyl, or halo-phenyl, with a substituted diethyl malonate having the formula $$XCH(CO_2C_2H_5)_2$$

where X is the cation of any base strong enough to extract a proton from diethyl malonate, to form a diethyl substituted carbonyl malonate having the formula:

$$R-\overset{O}{\underset{\|}{C}}-CH(CO_2C_2H_5)_2;$$

(b) separating said diethyl substituted carbonyl malonate;

(c) reacting said diethyl substituted carbonyl malonate with bromine to form a diethyl-α-bromo-substituted carbonyl malonate having the formula:

$$R-\overset{O}{\underset{\|}{C}}-CBr(CO_2C_2H_5)_2$$

wherein R has the same meaning as above;

(d) separating said diethyl-α-bromo-substituted carbonyl malonate; and (e) reacting the diethyl-α-bromo-substituted carbonyl malonate with an acid having the formula HY, where Y is the anion of any strong acid, to doubly decarboxylate the malonate and to form the α-bromomethyl ketone.

2. The process described in claim 1 wherein said substituted malonate is selected from the group consisting of diethyl sodium malonate and diethyl ethoxymagnesium malonate.

3. The process described in claim 1 wherein said acid is selected from the group consisting of hydrochloric acid and hydrobromic acid.

4. A process for the preparation of α-bromomethyl ketones having the formula:

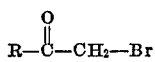

where R is a member of the group consisting of phenyl, naphthyl, phenanthryl, quinolyl, or substituted phenyl, naphthyl, phenanthryl, and quinolyl wherein the substituted group is halo, lower alkyl, lower alkoxy phenyl, or halo phenyl comprising the steps of:

(a) reacting a diethyl substituted carbonyl malonate having the formula:

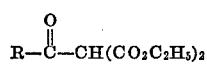

wherein R has the same meaning as above, with bromine to form a diethyl-α-bromo-substituted carbonyl malonate having the formula:

and (b) separating said diethyl-α-bromo-substituted carbonyl malonate; and (c) reacting said diethyl-α-bromo-substituted carbonyl malonate with an acid having the formula HY, where Y is the anion of any strong acid, to doubly decarboxylate the malonate and to form the α-bromomethyl ketone.

5. A process for the preparation of α-bromomethyl ketones having the formula:

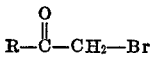

wherein R is a member of the group consisting of phenyl, naphthyl, phenanthryl, quinolyl, or substituted phenyl, naphthyl, phenanthryl, and quinolyl wherein the substituted group is halo, lower alkyl, lower alkoxy phenyl, or halo phenyl comprising the step of reacting a diethyl-α-bromo-substituted carbonyl malonate having the formula:

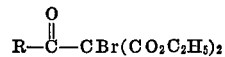

wherein R has the same meaning as above, with an acid having the formula HY, where Y is the anion of any strong acid, to doubly decarboxylate the malonate and to form the α-bromomethyl ketone.

References Cited

UNITED STATES PATENTS

| | | | |
|---|---|---|---|
| 2,816,059 | 12/1957 | Mills | 260—348 R |
| 2,935,444 | 5/1960 | Nickell | 260—473 R |
| 3,113,135 | 12/1963 | Hodel | 260—289 R |
| Re. 26,009 | 3/1966 | Buckman | 260—592 |
| 2,701,804 | 2/1955 | Hegedus | 260—473 R |
| 3,524,002 | 8/1970 | Baschang | 260—485 H |

OTHER REFERENCES

Chaikiu et al.: Jour. Am. Chem Soc., vol. 71, pp. 122–5 (1949).

McBee et al.: Jour. Am. Chem. Soc., vol. 74, pp. 3022–3 (1952).

Dox et al.: Jour. Am. Chem. Soc., vol. 44, pp. 1578–81 (1922).

Fuson et al.: "Organic Chemistry," Wiley, 1942, pp. 152–3.

DONALD G. DAUS, Primary Examiner

U.S. Cl. X.R.

260—283 R, 287 R, 348 R, 473 R, 475 R, 592, 593 H; 424—258, 330